United States Patent [19]

Lacroix et al.

[11] 4,074,966
[45] Feb. 21, 1978

[54] STABLE CONCENTRATED LIQUID PREPARATION OF A PAPER DYE OF THE DISAZO CLASS

[75] Inventors: Roger Lacroix, Huningue, France; Roland Haberli, Wurenlingen, Switzerland

[73] Assignee: Ciba-Geigy Corporation, Ardsley, N.Y.

[21] Appl. No.: 701,458

[22] Filed: June 30, 1976

[30] Foreign Application Priority Data

July 3, 1975 Switzerland .......................... 8677/75

[51] Int. Cl.² .................... C09B 67/00; C09B 31/02
[52] U.S. Cl. ............................................. 8/41 R; 8/7; 8/93; 260/175
[58] Field of Search ...................... 8/41 R, 93, 7, 41 R

[56] References Cited
U.S. PATENT DOCUMENTS

| 3,621,008 | 11/1971 | Ross | 260/175 |
| 3,989,452 | 11/1976 | Hugelshofer | 8/42 R |

FOREIGN PATENT DOCUMENTS 1,551,772  12/1968  France.

*Primary Examiner*—A. Lionel Clingman
*Attorney, Agent, or Firm*—Edward McC. Roberts; Prabodh I. Almaula

[57] ABSTRACT

There is described a stable concentrated liquid preparation of a paper dye of the disazo class, which preparation contains 20 to 40 per cent by weight of the dye of the formula

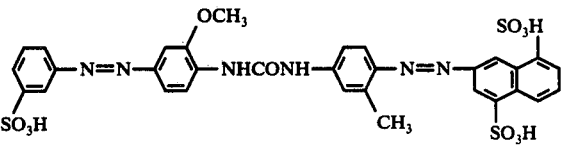

optionally in the form of an alkali salt, especially of the sodium salt, dissolved in 10 to 30 per cent by weight of water and 40 to 60 per cent by weight of a mono-, di-, tri- or tetraalkylene glycol and the use of this preparation for the dyeing and printing of paper, semi-cardboard and cardboard.

5 Claims, No Drawings

STABLE CONCENTRATED LIQUID PREPARATION OF A PAPER DYE OF THE DISAZO CLASS

The invention relates to a stable concentrated liquid preparation of a paper dye of the disazo class, to processes for producing it, and to its use for the dyeing especially of paper.

Liquid preparations of acid dyes, inter alia of paper dyes, are known for example from DOS No. 2,152,523 and from DAS No. 2,115,877. These use as one of the solvents, inter alia, triethanolamine. Since this on the one hand is commercially difficult to obtain and on the other hand is biologically not easy to decompose, and since moreover such liquid preparations have not too good a storage stability, efforts have been made to replace triethanolamine with something which does not have the said disadvantages and which, in addition, does not adversely affect the hitherto good coloristic properties of such liquid preparations.

A liquid preparation has now been found which does not contain triethanolamine, which is consequently more economical, which contaminates the waste-liquors less and which surprisingly combines all the desired properties. It is characterised in that it contains a paper dye of the disazo class dissolved in a solvent mixture of water and a mono-, di- tri- or tetraalkylene glycol.

The liquid preparation according to the invention contains 20 to 40, preferably 25 to 35 per cent by weight of the dye of the formula

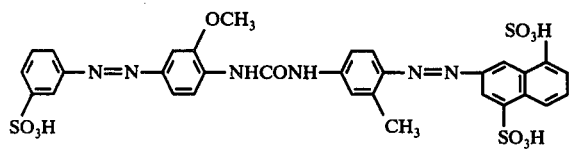

optionally in the form of an alkali salt, especially of the sodium salt, 10 to 30, preferably 15 to 25, per cent by weight of water and 40 to 60, preferably 45 to 55, per cent by weight of mono-, di-, tri- or tetraalkylene glycol, particularly tetraethylene glycol, the alkylene moiety of which contains 1 to 4 carbon atoms.

This novel liquid preparation constitutes a true solution. It has a high dye concentration; it is thinly liquid; it has a viscosity of about 100 to 200 cPs/20° C; it is stable in storage throughout several months at temperatures of between about −15° C and +50° C; it is soluble in cold water and in warm water in any proportion; and it may be considered as being toxicologically safe.

This liquid preparation is produced, for example, by a process wherein the defined disazo dye, either as the pure material or as an aqueous press cake, especially as the sodium salt, is mixed at room temperature with the mixture of water and the mono-, di-, tri- or tetraalkylene glycol until a solution exists, which is then filtered, optionally with the addition of a filtering auxiliary, to remove in particular the salts originating from the process for producing the dye.

The liquid preparation according to the invention is used, optionally after dilution with water, particularly for the dyeing and printing of paper, semi-cardboard and cardboard, whereby these materials can be dyed, for example, in the pulp, by brushing or by immersion. Furthermore, a liquid preparation of this kind can be used also for a continuous or discontinuous process for textile materials.

The following Examples illustrate the invention. In these Examples, "g" denotes gram, "SR" is an abbreviation for "Schopper Riegler", and, except where otherwise stated, % values are expressed as per cent by weight.

EXAMPLE 1

200 g of water is mixed with 500 g of tetraethylene glycol at room temperature in a 1500 ml beaker. There is then added portionwise to this mixture, with vigorous stirring, 300 g of the crude salt containing dye of the formula

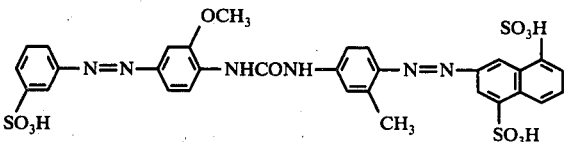

as neutral sodium salt, whereby there results a solution which, after completed addition of the dye, is stirred for a further 1 ½ hours at room temperature. There is advantageously added to this solution also 20 g of a filtering auxiliary (e.g. Hyflo, John Manville), and the solution is subsequently filtered to remove, in particular, the salt mixed with the dye. There is obtained a dye solution consisting of 30 per cent by weight of the above-mentioned dye, 20 per cent by weight of water and 50 per cent by weight of tetraethylene glycol, which solution is stable and, by virtue of its good miscibility with water in any proportion, very well suited for dyeing paper.

EXAMPLE 2

PRINTING PAPER 800 kg of bleached sulphate cellulose and 200 kg of bleached sulphite cellulose in the as supplied condition are placed into a pulper containing 14 cubic meters of industrial water, and beaten up until free from specks. The beating up operation requires 30 minutes. The beaten-up cellulose is then transferred to a discharge vat. From this vat the cellulose suspension is ground by means of pulp mills to a degree of fineness of 25° SR, and is subsequently fed into a mixing vat. There is then added to the pulp in the mixing vat 250 kg of kaolin Ia (as filler), as well as 0.1 to 0.05% of the dye formulation according to Example 1, based on the weight of absolutely dry fibre. After 15 minutes' absorption time, there are added 2% of resin glue, based on the weight of absolutely dry cellulose and, after 10 minutes, 4% of alum, based on the weight of absolutely dry cellulose. In the normal course of process, this paper pulp is then fed to the paper machine and from this is obtained a printing paper dyed in a yellow shade.

EXAMPLE 3

TISSUE PAPER 1000 kg of bleached sulphate cellulose in the as supplied condition is placed into a pulper containing 14 cubic meters of industrial water, and beaten up until free from specks, an operation requiring 30 minutes. The beaten-up cellulose is subsequently transferred to a discharge vat, and from this vat it is ground by means of pulp mills to degree of fineness of 25° SR; the cellulose is then fed into a mixing vat. An addition is made in the mixing vat of 0.1 to 0.05% of the dye formulation according to Example 1, relative to the weight of absolutely dry fibre. After 15 minutes' absorption time, this paper pulp passes in the normal course of the process to the paper machine, from which emerges a tissue paper dyed in a yellow shade.

EXAMPLE 4

SIZING PRESS APPLICATION 5 kg of dye in the form of a solvent-containing formulation according to Example 1 is dissolved in 1000 liters of a 10% aqueous anionic starch solution (soluble starch which is oxidatively hydrolysed), and the solution is applied by way of a sizing press to a paper web. The applied amount of the above solution is 1.5 g/m² of absolutely dry paper per side. There is obtained a paper dyed in a yellow shade.

We claim:

1. Stable concentrated liquid preparation of a paper dye of the disazo class, which preparation contains 20 to 40 per cent by weight of the dye of the formula

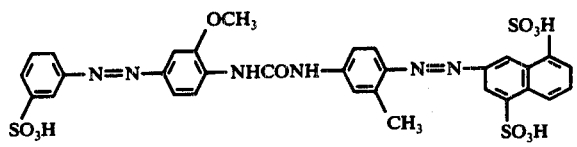

or an alkali salt thereof, dissolved in 10 to 30 per cent by weight of water and 40 to 60 per cent by weight of a tetraalkylene glycol.

2. Stable liquid preparation according to claim 1, which contains the dye in the form of the neutral sodium salt.

3. Stable liquid preparation according to claim 1 which contains 25 to 35 per cent by weight of the disazo dye according to claim 1, 15 to 25 per cent by weight of water, and 45 to 55 per cent by weight of a tetraalkylene glycol.

4. Stable liquid preparation according to claim 1 wherein the tetraalkylene glycol is tetraethylene glycol.

5. A process for preparing the stable concentrated liquid preparation according to claim 1, wherein a crude salt containing dye of the formula

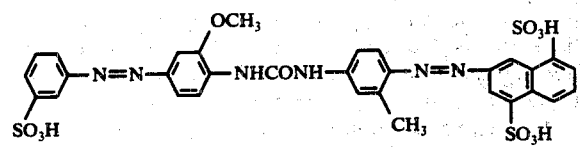

or sodium salt thereof, is stirred at room temerature, with a mixture of 10 to 30 percent by weight of water and 40 to 60 percent by weight of a tetraalkylene glycol such that there is present 20 to 40 percent by weight of said dye, until a solution of said dye results, and subsequently filtering the resulting solution.

* * * * *